United States Patent Office 3,639,354
Patented Feb. 1, 1972

3,639,354
ELASTOMERIC POLYURETHANES FROM POLYCARBONATES
Erwin Müller, Leverkusen, and Wilhelm Thoma, Cologne-Flittard, Germany, assignors to Farbenfabriken Bayer Aktiengesellschaft, Leverkusen, Germany
No Drawing. Filed Feb. 23, 1968, Ser. No. 707,479
Claims priority, application Germany, Feb. 28, 1967,
F 51,656
Int. Cl. C08g 22/08
U.S. Cl. 260—77.5 AP
2 Claims

ABSTRACT OF THE DISCLOSURE

Polyurethanes prepared by reacting diisocyanates, low molecular weight compounds containing at least two hydrogen atoms which are reactive with isocyanates and higher molecular weight, linear hydroxyl-containing polycarbonates based on 1,6-hexanediol and an alkoxylated 1,6-hexanediol of the formula

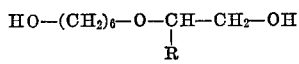

wherein R is hydrogen or $CH_3$.

---

This invention relates to elastomeric polyurethanes, and more particularly, to elastomeric polyurethanes having excellent mechanical properties, high hydrolysis resistance and low hardening temperatures.

The preparation of cross-linkable elastomeric polyurethanes from higher molecular weight, linear polyhydroxyl compounds, diisocyanates and low molecular weight chain lengthening agents which contain at least two hydrogen atoms which are reactive with isocyanates is already known and can be carried out by various methods. For example, the higher molecular weight polyhydroxyl compounds may be reacted with an excess of diisocyanate in a first step and the melt may be poured into molds after the addition of a chain lengthening agent which is added in a second step in equivalent or less than equivalent quantities than that which corresponds to the isocyanate groups still present after the first step is completed. After being heated for several hours, a high grade, elastic synthetic resin is obtained, which is cross-linked, if less than equivalent quantities of chain lengthening agent have been employed.

Another method for preparing cross-linkage elastomeric polyurethanes involves reacting the higher molecular weight polyhydroxyl compound in admixture with a chain lengthening agent such as a glycol, with an approximately equivalent quantity of diisocyanate or with an excess thereof, and shaping the reaction product under heat and pressure after it has been granulated. Depending upon the proportions in which the reactants are used, polyurethane resins having different degrees of hardness and elasticity can be obtained since the hardness increases with increasing quantities of diisocyanate and glycol and decreases with decreasing quantities of diisocyanate and glycol. Cross-linked synthetic resins which can be processed in the same manner as thermoplastic resins are obtained by this method.

In order to obtain synthetic resins which are ready for processing and which are only converted into the cross-linked state in the second stage, the higher molecular weight polyhydroxyl compounds may be reacted in the form of a mixture with a chain lengthening agent with a smaller quantity of a diisocyanate than that which corresponds to the sum of end groups of the higher molecular weight polyhydroxyl compound and chain lengthening agent. In this way, one obtains rollable products which are stable in storage and can be worked up later into the cross-linked state by mixing additional quantities of a diisocyanate such as dimeric tolylene diisocyanate into them.

These stable, rollable products can also be cross-linked with peroxides if suitable diisocyanates such as 4,4'-diphenyl methane diisocyanate are used, and with sulphur or formaldehyde if suitable unsaturated chain lengthening agents are used.

Substantially linear, segmented polyurethanes are formed by the reaction between NCO prepolymers and approximately equivalent quantities of NH-functional chain lengthening agents such as diamines, hydrazine or dihydrazides in highly polar solvents containing amido or sulphoxide groups such as dimethylformamide, dimethylacetamide or dimethylsulphoxide. The polyurethane solutions thus obtained can be used for the production of highly elastic filaments, coatings and microporous coverings by removing the solvent by evaporation or coagulation. If desired, these polyurethanes may also be cross-linked with cross-linking agents such as polymethylol compounds.

It has also been proposed heretofore to prepare cross-linked, elastic synthetic polyurethanes using linear polycarbonates as the higher molecular weight polyhydroxy compound. For example, it has been suggested that some such suitable polyurethanes could be prepared from 1,6-hexanediol polycarbonate and formaldehyde. The latter compounds are advantageous because they have lower softening point than do the former, as a consequence of which polyurethane resins prepared from hexanediol-polycarbonate-acetals have better response to the cold than elastomers obtained from hexanediol-polycarbonate. Although polyurethane elastomers obtained from hexanediol-polycarbonate as well as those obtained from hexanediol-polycarbonate-acetals both have good resistance to hydrolysis as demonstrated under usual testing conditions, hexanediol-polycarbonate-acetals do contain acetal linkages which are more easily split up than are carbonate groups, especially in the presence of acid.

It is therefore an object of this invention to provide a polyurethane elastomer and a method for preparing it which are devoid of the foregoing disadvantages. Another object of this invention is to provide polyurethane resins having excellent mechanical properties, a high degree of hydrolysis, low hardening temperatures and excellent resistance to cold.

The foregoing objects and others which will become apparent from the following description are accomplished in accordance with this invention, generally speaking, by providing a polyurethane prepared by reacting diisocyanates, low molecular weight compounds containing at least two hydrogen atoms reactive with isocyanates and a higher molecular weight, linear polycarbonate diol prepared from a mixture of 1,6-hexanediol and an alkoxylated 1,6-hexanediol having the formula

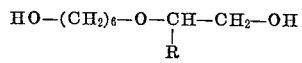

wherein R is hydrogen or $CH_3$.

By using polycarbonates based on mixtures of 1,6-hexanediol and an alkoxylated 1,6-hexanediol in the preparation of the polyurethane, it is possible to prepare resins which have excellent mechanical properties and a high degree of resistance to hydrolysis. On the other hand, however, liquid polycarbonates obtained exclusively from an alkoxylated 1,6-hexanediol of the foregoing formula yield polyurethane elastomers which are of little or no technical importance since they have neither high strength nor any high degree of resistance to hydrolysis. In addition, it is possible to prepare higher molecular weight, linear polycarbonates having lower softening points from mixtures of 1,6-hexanediol and an alkoxylated 1,6-hexanediol of the foregoing formula than from pure hexanediol. Since the softening point of the polycarbonate decreases with increasing quantities of the alkoxylated 1,6-hexanediol, polycarbonates having softening points ranging from relatively high to low may be obtained depending upon the ratio of the reactants used to prepare them. Although any ratio of components may be used depending upon the desired product, it is preferred in the practice of this invention to employ molar ratios of from about 10:1 to about 1:1 of 1,6-hexanediol to the alkoxylated 1,6-hexanediol. In addition, as illustrated in the following table, b-hydroxypropyl-1,6-hexanediol exerts a greater lowering effect on the softening point of a polycarbonate than does b-hydroxyethyl-1,6-hexanediol.

|  | Softening point, °C. |
|---|---|
| Hexanediol-polycarbonate (molecular weight 2000) | 42 |
| Polycarbonate from a mixture of 11 mols of hexanediol (molecular weight 2000) | 39–40 |
| 10 mols of hexanediol, 3 mols b-hydroxyethyl- (molecular weight 2000) | 35–37 |
| 10 mols hexanediol, 3 mols b-hydroxyproyl-hexanediol (molecular weight 2000) | 29–30 |

Polycarbonates with the desired softening points can thus be obtained by the present process if suitable molar ratios of the reactants to one another are employed in each case without the introduction of foreign groups which act as chain linking expedients. Since the softening point of the higher molecular weight polyhydroxyl compound determines the behavior in the cold of the synthetic resins prepared from it, the present process permits the preparation of synthetic resins having an excellent resistance to the cold. In this connection, it is surprising that such synthetic resins also have excellent mechanical properties and good resistance to hydrolysis, particularly since polyurethanes prepared from linear, higher molecular weight polycarbonates which have in turn been prepared exclusively from 1,6-alkoxylated hexanediol have only average mechanical properties and little hydrolysis resistance.

The preparation of the higher molecular weight polycarbonates of this invention is advantageously carried out by ester interchange in the melt of the diol components with diarylcarbonates such as diphenylcarbonate as described in U.S. Pat. 3,028,365 as well as by any other suitable method, particularly as described therein. The ester interchange reaction will proceed even without the assistance of a catalyst so that products which are especially suitable for further reaction may thus be prepared. Another possible method of preparation consists in reacting 1,6-hexanediol dichlorocarbonic acid esters with the diol components in the presence of agents which bind hydrogen chloride such as, for example potassium carbonate, sodium carbonate, ethylene oxide and the like or mixtures thereof. The molecular weight of the polycarbonates to be used in this invention should be between about 800 and about 3000, preferably between about 1000 and about 2500, most preferably in the region of about 2000.

Instead of the higher molecular weight mixed carbonate polymers, mechanical mixtures of hexanediol-polycarbonate and the polycarbonates obtained from alkoxylated, 1,6-hexanediol may also be used in accordance with this invention.

Any suitable diisocyanate may be used to prepare the polyurethane resin of this invention. Some such suitable isocyanates are, for example, 1,5-naphthylene diisocyanate, m- and p-phenylene diisocyanate, 2,4- and 2,6-tolylene diisocyanate and mixtures of the isomeric tolylene diisocyanates, as well as any of those mentioned in Canadian Pat. 698,636.

Any suitable chain lengthening agents for the reaction without solvents such as, for example, glycols such as 1,4-butanediol, 1,6-hexanediol, 2,3-butanediol, p-phenylene-di-b-hydroxyethylether, p-xylylene glycol, naphthalene-di-b-hydroxyethylether and the like may be used. Any suitable unsaturated glycols which may be used, for example, for the purpose of subsequent cross-linking with sulphur may be used. Some such suitable glycols are, for example, glycerol monoallyl ether, dimethylol dihydropyran, 1,4 - butane-bis-N,N'-allyl - N,N' - b - hydroxyethyl urethane and the like. For subsequent cross-linking with formaldehyde, cross-linking agents such as m-dihydroxyethyltolylene, for example, may be used. Some other chain lengthening agents which may also be used, are, for example, 3,3'-dichloro-4,4'-diaminodiphenylmethane, diethyltolylene diamine and the like. Any suitable chain lengthening agents for reaction in solution may be used such as, for example, ethylene diamine, 1,3-xylylene diamine, pyrazine, hydrazine, carbodihydrazide, malonic acid dihydrazide, resorcinol diacetic acid hydrazide, amino acetic acid hydrazide, butanediol-bis-carbazic acid ester, hexamethylene-bis-semicarbazide and the like as well as any of those mentioned in U.S. Pat. 3,201,372.

The products of the instant process can be used in the construction of machinery to prepare gear wheels, drive chains or seals; in the construction of vehicles, as shoe sole materials and coatings.

The invention is further illustrated but is not intended to be limited by the following examples in which all parts and percentages are by weight unless otherwise specified.

PREPARATION OF STARTING MATERIAL (A) A mixture of about 12,980 parts of 1,6-hexanediol, about 4860 parts of b-hydroxyethylhexanediol (molar ratio 10:3) and about 27,000 parts of diphenylcarbonate is gradually heated to from about 210° to about 215° C. while nitrogen is passed over the reaction mixture. Phenol distils off at about 180° C. The last residues of phenol distil off under a vacuum of about 12 mm. at about 210° to about 215° C. external temperature. About 2512 parts of distillate are obtained.

The melt, cooled to about 80° C., is poured out onto metal sheets. A pale wax having an OH number of about 56 and softening point of about 35° to about 37° C. is obtained.

EXAMPLE 1

About 80 parts of 4,4'-diisocyanato-diphenylmethane are introduced at about 130° C., with stirring, into about 200 parts of an anhydrous polycarbonate which has been prepared as described in part A and which has an OH number of about 56=1.7% OH.

After about 20 minutes, about 18 parts of butanediol-(1,4) are stirred into the melt at the same temperature, and the homogeneous mixture is poured into molds. The mixture solidifies after about 20 minutes. It is then removed from the mold and heated at about 100° C. for from about 20 to about 24 hours. An elastic polyurethane is obtained which has the following mechanical properties:

|  |  | After 14 days aging [1] |
|---|---|---|
| Mechanical strength, kg./cm.$^2$ | 217 | 213 |
| Elongation, percent | 405 | 423 |
| Permanent elongation, percent | 20 | 24 |
| Load at 300% elongation | 137 | 122 |
| Shore hardness A | 87 | 83 |
| Elasticity | 31 | 36 |
| Dimensional stability | 34 | 33 |

[1] By hydrolysis at 70° C., 95% atmospheric humidity.

EXAMPLE 2

About 200 parts of a polycarbonate having an OH number of about 49, a softening point of about 39° to about 40° C. and prepared from About 14,000 parts of hexanediol-(1,6) and
About 3,250 parts of hydroxyethylhexanediol in a molar ratio of about 11:2
About 27,000 parts of diphenylcarbonate as described in part A are reacted with
About 80 parts of 4,4'-diisocyanate-diphenylmethane and
About 19 parts of butanediol-(1,4) as described in Example 1.

Polyurethane elastomer having the following properties is obtained:

| | | After 14 days aging [1] |
|---|---|---|
| Mechanical strength, kg./cm.$^2$ | 257 | 264 |
| Elongation, percent | 380 | 407 |
| Permanent elongation, percent | 16.5 | 20 |
| Load at 300% elongation | 177 | 150 |
| Shore hardness A | 88 | 88 |
| Elasticity | 38 | 39 |
| Dimensional stability | 48 | 40 |

[1] Same as above.

EXAMPLE 3

About 200 parts of a polycarbonate having an OH number of about 57, a softening point of from about 29° to about 30° C. and prepared as described in part A from about 12,980 parts of 1,6-hexanediol and about 5,820 parts of b-hydroxypropylhexanediol in a molar ratio of about 10:3, and about 2,770 parts of diphenylcarbonate are reacted as described in Example 1 with about 80 parts of 4,4-diphenylmethane diisocyanate and about 18 parts of 1,4-butanediol.

An elastomer having the following properties is obtained:

| | | After 14 days aging [1] |
|---|---|---|
| Mechanical strength, kg./cm.$^2$ | 152 | 136 |
| Elongation, percent | 478 | 475 |
| Permanent elongation, percent | 28 | 36 |
| Load at 300% elongation | 99.5 | 74 |
| Shore hardness A | 85 | 83 |
| Elasticity | 31 | 34 |
| Dimensional stability | 33 | 27 |

[1] Same as above.

EXAMPLE 4

About 200 parts of a polycarbonate derived from 1,6-hexanediol, b-hydroxyethoxy-1,6-hexanediol and diphenylcarbonate (molar ratio of diols 11:2) and having an OH number of about 49 are treated with about 0.2 ml. of about a 33% $SO_2$ solution in dioxane in order to standardize its reactivity, and then heated for one hour at 15 mm. Hg at 100° C. The polycarbonate pretreated in this way is heated with about 41 parts of diphenylmethane-4,4'-diisocyanate for about 60 minutes at about 100° C. The NCO prepolymer melt is dissolved in about 200 parts of dioxane. The NCO content of this solution is about 1.25%.

A solution of about 6 parts of carbodihydrazide in about 600 parts of dimethylformamide is introduced into the reaction vessel at about 40° to about 45° C. About 400 parts of the NCO prepolymer solution diluted with about 40 parts of dimethylformamide are run into this solution of chain lengthening agent. A viscous elastomer solution is obtained to which about 12 parts of a 10% solution of 1,6-hexanediisocyanate in dioxane is added in the course of about 2 hours to further increase its viscosity.

The highly viscous elastomer solution thus obtained is then poured onto glass plates to form films from which the solvent evaporates at about 100° C. within about 1½ hours.

The elastic films formed have the following properties:

| | |
|---|---|
| Thickness (mm.) | 0.05 |
| Ultimate tensile strength (kg./cm.$^2$) based on the original transverse section | 750 |
| Elongation (percent) | 440 |
| Ultimate tensile strength (kg./cm.$^2$) based on the cross section of the break | 4050 |
| Modulus (20%) (kg./cm.$^2$) | 15 |
| Modulus (300%) (kg./cm.$^2$) | 255 |
| Tear propagation resistance (kg./cm.) according to Graves | 22 |
| Microhardness | 74 |

The elastomer solution is spun into elastic filaments in a wet spinning apparatus (20 aperture nozzle, aperture diameter 0.12 mm., temperature of aqueous precipitation bath 85° C., spinning velocity 10 m./min.).

In order to determine the hydrolysis properties of the material, the filaments are kept for about 4 hours and about 16 hours respectively in a bath containing soda and soap (about 2 parts/liter and about 5 parts/liter) which is heated to about 90° C.

| | Hydrolysis | | |
|---|---|---|---|
| | 0 hours | 4 hours | 16 hours |
| Titer (den.) | 160 | 161 | 159 |
| Ultimate tensile strength (g./den.) | 0.54 | 0.70 | 0.67 |
| Ultimate tensile strength (based on titer at break) (g./den.) | 3.1 | 4.3 | 4.4 |
| Elongation (percent) | 470 | 510 | 550 |
| Modulus 300% (mg./den.) | 196 | 197 | 157 |
| Modulus 150% (mg./den.) | 15 | 12 | 10 |
| Permanent elongation (percent) | 18 | 96 | 16 |

EXAMPLE 5

About 100 parts of a polycarbonate prepared from 1,6-hexanediol and diphenylcarbonate and having an OH number of about 55.4 and about 90 parts of a mixed polycarbonate of 1,6-hexanediol, 1,6-b-hydroxyethoxyhexanediol and diphenylcarbonate (molar ratio of diols 10:3, OH number about 61.5) are heated with about 42 parts of diphenylmethane-4,4'-diisocyanate for about 75 minutes at about 100° C. in a manner analogous to Example 4 after pretreatment with about a 33% solution of $SO_2$. The NCO prepolymer melt is dissolved in about 175 parts of dioxane; the solution has an NCO content of about 1.4%. About 300 parts of the NCO prepolymer solution is run into a solution of about 5 parts of carbodihydrazide in about 425 parts of dimethylformamide at about 50° C. About 12 ml. of about a 10% 1,6-hexanediisocyanate solution in dioxane are aded to the viscous elastomer solution to produce a further increase in viscosity. The highly viscous elastomer solution is cast into films and spun into filaments as described in Example 4.

In order to determine the hydrolysis properties of the material, the filaments are heated to about 90° C. in a bath containing soda and soap as in Example 4.

| | Hydrolysis | | |
|---|---|---|---|
| | 0 hours | 4 hours | 16 hours |
| Titer (den.) | 140 | 145 | 141 |
| Ultimate tensile strength (g./den.) | 0.76 | 0.72 | 0.62 |
| Ultimate tensile strength (based on titer at break) (g./den.) | 4.5 | 4.2 | 3.9 |
| Elongation (percent) | 490 | 485 | 520 |
| Modulus 300% (mg./den.) | 205 | 202 | 159 |
| Modulus 150% (mg./den.) | 12 | 11 | 10 |
| Permanent elongation (percent) | 22 | 22 | 24 |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A polyurethane elastomer prepared by a process which comprises reacting a polyisocyanate with a chain lengthening agent containing at least two hydrogen atoms which are reactive with NCO groups and a polycarbonate diol prepared by reacting a diaryl carbonate with a mixture of 1,6-hexanediol and an alkoxylated 1,6-hexanediol having the formula $$HO-(CH_2)_6-O-CH-CH_2-OH$$
$$\phantom{HO-(CH_2)_6-O-C}|$$
$$\phantom{HO-(CH_2)_6-O-C}R$$

wherein R is hydrogen or $CH_3$.

2. The elastomer of claim 1 wherein the molar ratio of 1,6-hexanediol to alkoxylated 1,6-hexanediol in the polycarbonate diol is from about 10:1 to about 1:1.

References Cited

UNITED STATES PATENTS 3,110,686   11/1963   Newton _____ 260—2.5

DONALD E. CZAJA, Primary Examiner

M. J. WELSH, Assistant Examiner

U.S. Cl. X.R.

117—124 E; 260—77.5 D

UNITED STATES PATENT OFFICE
CERTIFICATE OF CORRECTION

Patent No. 3,639,354   Dated February 1, 1972

Inventor(s) Erwin Muller, et al

It is certified that error appears in the above-identified patent and that said Letters Patent are hereby corrected as shown below:

Column 2, line 31, cancel "point" and insert -- points --. Column 3, line 24, insert -- 2 mols of b-hydroxyethyl hexanediol -- between "hexanediol" and "(molecular"; line 26, insert -- hexanediol -- before "(molecular weight 2000)"; line 72, insert -- 4,4'-diphenylmethane diisocyanate, -- between "anate," and "m- and p-". Column 5, in the chart beginning in line 40, after Permanent elongation, percent, "36" should read -- 34 --. Column 6, line 45, "1.4%" should read -- 1.41% --.

Signed and sealed this 14th day of November 1972.

(SEAL)
Attest:

EDWARD M. FLETCHER, JR.
Attesting Officer

ROBERT GOTTSCHALK
Commissioner of Patents